US007077620B2

(12) United States Patent
Ishioka

(10) Patent No.: US 7,077,620 B2
(45) Date of Patent: Jul. 18, 2006

(54) CONVEYING APPARATUS WITH CARRIERS

(75) Inventor: Yasushi Ishioka, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 62 days.

(21) Appl. No.: 10/838,831

(22) Filed: May 3, 2004

(65) Prior Publication Data

US 2004/0228720 A1 Nov. 18, 2004

(30) Foreign Application Priority Data

May 12, 2003 (JP) ............... 2003-132680

(51) Int. Cl.
*B65G 35/00* (2006.01)

(52) U.S. Cl. ............... 414/749.1; 198/468.6; 198/468.8

(58) Field of Classification Search ............ 414/749.1, 414/589; 198/406, 414, 468.6, 468.8
See application file for complete search history.

(56) References Cited

U.S. PATENT DOCUMENTS 5,743,705 A * 4/1998 Eissfeller ............... 414/749.1

* cited by examiner

*Primary Examiner*—Donald W. Underwood

(57) ABSTRACT

The present invention provides a carrier elevating apparatus suitable for a low floor type conveying apparatus with carriers. A cam rail 36 extends along a horizontal running track, along which a carriage runs. The carriage includes a deck 1, on which an erectable cross-linking mechanism 3 is mounted. The cross-linking mechanism 3 supports and vertically moves a carrier 2A. The cross-linking mechanism 3 includes a link 14a and a link 14b. The link 14a is supported at its lower end pivotably by the deck 1 through a fixed horizontal pivot shaft 16. The links 14a and 14b are connected together at their middle points by a fulcrum shaft 15, which is parallel with the pivot shaft 16. The link 14a is fitted with a driven member 25 between the shafts 15 and 16. An elevator 27 is supported vertically movably by the deck 1. The elevator 27 includes a bearing member 32 fixed to its top and a cam follower 34 supported by its bottom. The driven member 25 is supported by the bearing member 32 horizontally movably relative to it. The cam follower 34 can follow the cam rail 36, lifting the elevator 27, so that the cross-linking mechanism 3 erects to elevate the carrier 2A.

5 Claims, 8 Drawing Sheets

CONVEYING APPARATUS WITH CARRIERS

BACKGROUND OF THE INVENTION

1. Field of the Invention

The present invention relates to a conveying apparatus including a car type conveyor or a slat conveyor and fitted with carriers.

2. Description of Related Art

Conveying apparatus of this type are disclosed in Japanese Unexamined Patent Publication Nos. H7-157039 and H7-172538, for example. Each of these apparatus vertically moves carriers by means of a cam rail extending along a running track, not by means of cylinder units or other actuators, each of which might be fitted to one of the plates.

The conveying apparatus disclosed in Publication No. H7-157039 includes a slat conveyor extending along a running track. The slat conveyor is fitted with elevators at intervals along it. The elevators can move vertically relative to the slat conveyor, and each of them directly supports a carrier. A cam rail is fixed relative to the slat conveyor and lifts the elevators. The cam rail makes it possible to keep the carriers at an elevated position in a limited section of the running track. The strokes of the elevators, which equal the height of the cam rail, equal the lift of the carriers. Accordingly, a greater lift of the carriers require the cam rail to be higher. The higher rail requires a higher space for it, consequently raising the level of the carriers relative to the floor. As a result, this conveying apparatus is not suitable for a low floor structure.

The conveying apparatus disclosed in Publication No. H7-172538 includes a slat conveyor extending along a running track. This slat conveyor supports cross-linking mechanisms at intervals along it. Each of the cross-linking mechanisms supports a carrier and includes pairs of links, which are connected together by a fulcrum shaft. The slat conveyor is fitted with elevators, which can move vertically relative to it, and each of which supports one of the fulcrum shafts of the cross-linking mechanisms. A cam rail is fixed relative to the slat conveyor and lifts the elevators, which elevate the carriers. This conveying apparatus, as compared with the apparatus disclosed in Publication No. H7-157039, makes it possible to increase the lift of the carriers relative to the strokes of the elevators, which equal the height of the cam rail. Nevertheless, a greater lift of the carriers require the cam rail to be correspondingly higher. As a result, the conveying apparatus is still unsuitable for a low floor structure.

SUMMARY OF THE INVENTION

The object of the present invention is to provide a conveying apparatus including carriers that solves the foregoing problems.

A conveying apparatus according to one aspect of the present invention includes a cam rail and a carriage. The cam rail extends along a horizontal running track, along which the carriage runs. The carriage includes a deck, on which an erectable cross-linking mechanism is mounted. The cross-linking mechanism supports and vertically moves a carrier. The cross-linking mechanism includes a first link and a second link. One end of the first link is supported on a horizontal pivot axis adjacent to and fixed relative to the deck. The first and second links are connected together at their middle points by a fulcrum parallel with the pivot axis. The first link is fitted with a driven member between the fulcrum and the pivot axis. An elevator is supported vertically movably by the deck. The elevator includes a bearing member fixed to its top and a cam follower supported by its bottom. The driven member is supported by the bearing member horizontally movably relative to it. The cam follower can follow the cam rail, lifting the elevator, so that the cross-linking mechanism erects to elevate the carrier.

This conveying apparatus makes it possible to sufficiently increase the lift of the carrier relative to the strokes of the elevator, in comparison with the prior art where an elevator elevates the fulcrum shaft connecting the links of a cross-linking mechanism. In other words, it is possible to secure a necessary lift of the carrier without increasing the height of the cam rail, which equals the elevator strokes. The conveying apparatus may be a friction drive type apparatus for a low floor structure, which includes a deck in the form of a plate having frictional surfaces on both sides, as will be described below in the description of embodiments of the present invention. In this case, the cam rail can be laid without obstruction in the low space between a floor and the carriage that runs at a low level over the floor. The thus laid rail can easily lift the carrier to a desired level.

As stated above, the driven member of the cross-linking mechanism is supported by the bearing member at the top of the elevator horizontally movably relative to it. Consequently, the elevator can be supported vertically movably, and the cam rail needs to merely lift it. This makes it possible to simplify the whole structure of the carrier driving mechanism of the carriage.

A conveying apparatus according to another aspect of the present invention includes a cam rail and a carriage. The cam rail extends along a horizontal running track, along which the carriage runs. The carriage includes a deck, on which an erectable cross-linking mechanism is mounted. The cross-linking mechanism supports and vertically moves a carrier. The cross-linking mechanism includes a first link, a second link, a third link, and a fourth link. One end of the first link and one end of the second link are supported by a pivot axis, which is adjacent to and fixed to the deck. Middle points of the four links are connected together by a fulcrum shaft, which is parallel with the pivot axis. The first and second links are connected together by a connecting shaft, which is parallel with the pivot axis and positioned between the fulcrum and pivot shafts. The connecting shaft is fitted with a driven member. An elevator is supported vertically movably by the deck. The elevator includes a bearing member fixed to its top and a cam follower supported by its bottom. The driven member is supported by the bearing member horizontally movably relative to it. The cam follower can follow the cam rail, lifting the elevator, so that the cross-linking mechanism erects to elevate the carrier.

The first and third links pair with each other. The second and fourth links pair with each other. The two pairs of links can be elevated by the single elevator and cooperate stably with each other.

In each of the conveying apparatus, the bearing member of the elevator may have a guide groove formed in it, and the driven member of the cross-linking mechanism may be a roller rotatable on an axis parallel with the horizontal pivot axis. The roller engages with the guide groove rollably and movably. The guide groove and the roller cooperate to transmit the elevating operation of the elevator smoothly and reliably to the cross-linking mechanism. Even if the elevator includes a vertical columnar shaft that can rotate on its own axis, the roller serves to keep the elevator from rotating.

A conveying apparatus according to still another aspect of the present invention includes a pair of cam rails and a carriage. The cam rails extend along a horizontal running track, along which the carriage runs. The carriage includes a deck, on which a front erectable cross-linking mechanism and a rear erectable cross-linking mechanism are mounted. Each of the cross-linking mechanisms is spaced from the other along the running track. Each of the cross-linking mechanisms supports and vertically moves a carrier. Each of the two cross-linking mechanisms includes a first link and a second link, each of which extends on a vertical plane perpendicular to the running track. One end of the first link is supported on a horizontal pivot axis, which is adjacent to and fixed relative to the deck. Middle points of the two links are connected together by a horizontal fulcrum. The pivot axis and the fulcrum are parallel with the running track. The first link is fitted with a driven member between the pivot axis and the fulcrum. A pair of elevators is supported vertically movably by the deck. Each of the elevators includes a bearing member fixed to its top and a cam follower supported by its bottom. Each of the driven members of the two cross-linking mechanisms is supported by one of the bearing members of the two elevators horizontally movably relative to it. Each of the cam followers of the two elevators can follow one of the cam rails, lifting the associated elevator, so that the associated cross-linking mechanism erects to elevate the associated carrier. The two driven members are offset from each other perpendicularly to the running track. The two cam rails are offset longitudinally from each other so as to lift the two elevators in synchronism.

The front and rear cross-linking mechanisms can stably support the carriers, which may support a work long in parallel with the running track. These cross-linking mechanisms can be erected in synchronism so as to elevate the carriers-safely in parallel.

A conveying apparatus according to a further aspect of the present invention includes a cam rail and a carriage. The cam rail extends along a horizontal running track, along which the carriage runs. The carriage includes a deck, on which an erectable cross-linking mechanism is mounted. The cross-linking mechanism supports and vertically moves a carrier. The cross-linking mechanism includes at least a first link, a second link, a third link and a fourth link. One end of the first link is supported on a horizontal pivot axis, which is adjacent to and fixed relative to the deck. The other end of the first link is connected pivotably with one end of the third link. One end of the second link is connected pivotably with one end of the fourth link. Middle points of the first and second links are connected together by a lower fulcrum, which is parallel with the pivot axis. Middle points of the third and fourth links are connected together by an upper fulcrum, which is parallel with the pivot axis. The first link is fitted with a driven member between the pivot axis and the lower fulcrum. An elevator is supported vertically movably by the deck. The elevator includes a bearing member fixed to its top and a cam follower supported by its bottom. The driven member is supported by the bearing member horizontally movably relative to it. The cam follower can follow the cam rail, lifting the elevator, so that the cross-linking mechanism erects to elevate the carrier.

The first and second links of this conveying apparatus pair with each other as a lower pair of links. The third and fourth links of the apparatus pair with each other as an upper pair of links, which is connected vertically with the lower pair. With respect to the stroke of the elevator, the vertically connected pairs of links make it possible to multiply the lift of the carrier by the number of pairs of links. Accordingly, the conveying apparatus is effective in conveying a work requiring a great lift.

DETAILED DESCRIPTION OF THE PREFERRED EMBODIMENTS

Figure 1:
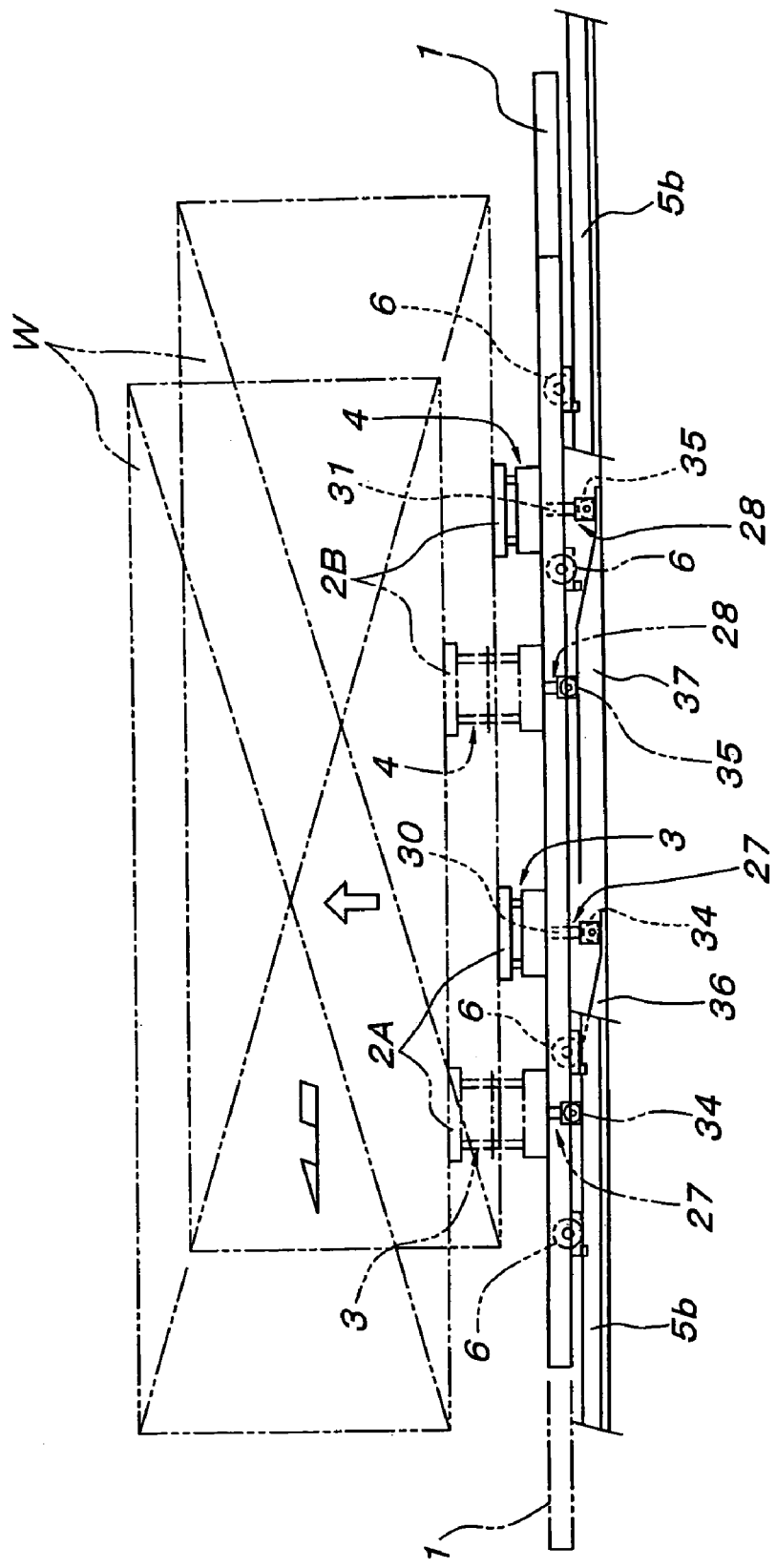
FIG. 1 is a partially broken side view of part of a conveying apparatus according to one embodiment of the present invention, showing a carriage just in the rear of the limited section of a running track.
Figure 2:
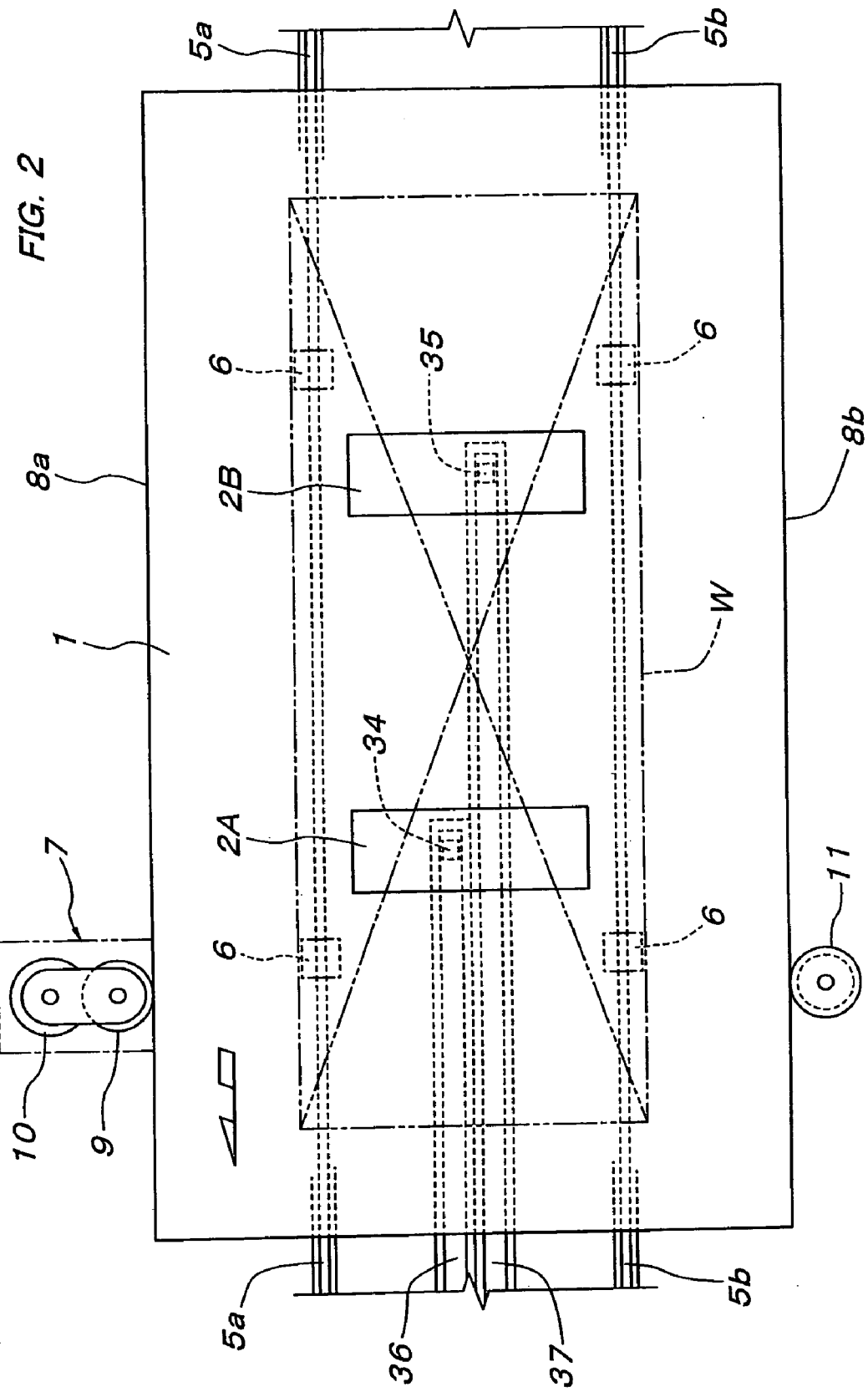
FIG. 2 is a top plan of part of the conveying apparatus, showing the carriage as shown in FIG. 1 and a deck driver.
Figure 3:
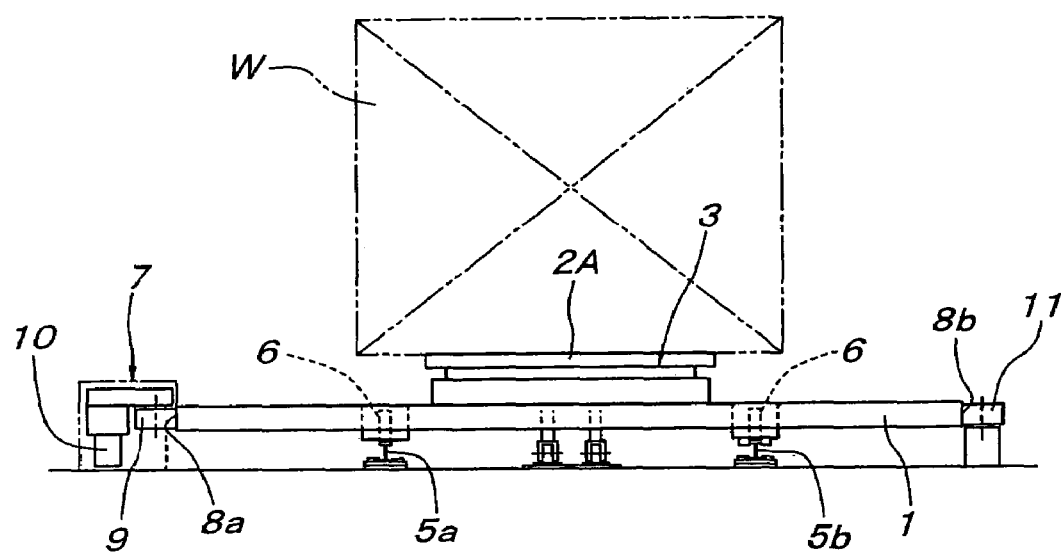
FIG. 3 is a front view of the conveying apparatus, showing the carriage as shown in FIG. 1.

A conveying apparatus embodying the present invention includes a plurality of carriages, one of which is shown in FIGS. 1–7. With reference to FIGS. 1–3, each of the carriages includes a deck 1 in the form of a horizontal plate. The deck 1 is rectangular with both sides longer than both ends. The deck 1 has parallel frictional surfaces 8a and 8b formed on its right and left sides, respectively. A front cross-linking mechanism 3 and a rear cross-linking mechanism 4 are mounted on the deck 1 and spaced from each other longitudinally of it. A front horizontal carrier 2A and a rear horizontal carrier 2B rest on the cross-linking mechanisms 3 and 4, respectively, and support a workpiece W on them. The deck 1 is supported by a front pair and a rear pair of wheel units 6. The wheel units 6 of the carriages run on a right guide rail 5a and a left guide rail 5b, which extend along a running track on a floor. As shown in FIG. 3, each left wheel unit 6 includes a pair of antivibration rollers for rolling on both sides of the left guide rail 5b.

A plurality of deck drivers 7, one of which is shown in FIGS. 2 and 3, are fixed on the floor at intervals along the running track and frictionally drive the decks 1 of the carriages. Each deck driver 7 includes a frictional wheel 9 and a motor 10 located on the right side of the running track and a back-up roller 11 located on the left side. The frictional wheel 9 and back-up roller 11 cooperate for compressive contact with the frictional surfaces 8a and 8b, respectively, of the deck 1 located between them. The motor 10 drives the frictional wheel 9 to move the deck 1 forward at a constant speed along the running track. The intervals at which the deck drivers 7 are located may be roughly equal to or slightly shorter than the length of each deck 1 so that the deck being driven by each deck driver 7 except the last one can engage successively with the next driver. This enables the carriages to run at optional intervals and the constant speed. Alternatively, the driver interval may be sufficiently longer than the deck length so that the deck 1 being driven by each deck driver 7 can successively push the preceding deck having disengaged from this driver.

As shown in FIGS. 4–7, each cross-linking mechanism 3 or 4 is bilaterally symmetrical, and the cross-linking mechanisms 3 and 4 of each of the carriages are spaced from each other longitudinally of the associated deck 1. Each cross-linking mechanism 3 or 4 includes a pair of intercrossed links 12 and a pair of links 13. Each pair of intercrossed links 12 or 13 is spaced from the other longitudinally of the deck 1. The inner links 14a and outer links 14b of the pairs 12 and 13 are equal in length. Each link 14a or 14b extends on a vertical plane lateral of the deck 1. The four links 14a and 14b of each cross-linking mechanism 3 or 4 are connected together at their middle points by a horizontal fulcrum shaft 15. The lower ends of the inner links 14a of each cross-linking mechanism 3 or 4 are supported through a fixed horizontal pivot shaft 16 by a pair of bearings 16a and 16b, which are fixed on the deck 1. The upper ends of the inner links 14a support a pair of upper rollers 18a and 18b through a horizontal roller shaft 19. The upper rollers 18a and 18b engage rollably and movably with a front guide rail 17a and a rear guide rail 17b, respectively, which are U-shaped in cross section. The guide rails 17a and 17b are fixed to the bottom of the associated carrier 2A or 2B and extend laterally of the deck 1. The upper ends of the outer links 14b of each cross-linking mechanism 3 or 4 are supported through a horizontal fixed pivot shaft 20 by a pair of bearings 20a and 20b, which are fixed to the bottom of the associated carrier 2A or 2B. The lower ends of the outer links 14b support a pair of lower rollers 22a and 22b through a horizontal roller shaft 23. The lower rollers 22a and 22b engage rollably and movably with a front guide rail 21a and a rear guide rail 21b, respectively, which are U-shaped in cross section. The guide rails 21a and 21b are fixed to the top of the deck 1 and extend laterally of it. The horizontal shafts 15, 16, 19, 20 and 23 extend longitudinally of the deck 1.

As stated above, each cross-linking mechanism 3 or 4 is bilaterally symmetrical. The fulcrum shafts 15 of the cross-linking mechanisms 3 and 4 of each of the carriages can move on a vertical plane extending through the center of the associated deck 1 longitudinally of it. The lower pivot shafts 16 of the associated cross-linking mechanisms 3 and 4 are positioned on the right and left sides, respectively, of the deck 1. The inner links 14a of each cross-linking mechanism 3 or 4 are connected together by a connecting shaft 24, which is positioned between the associated shafts 15 and 16 and parallel with them. The connecting shaft 24 has a middle portion small in diameter, which supports a driven member 25 (roller 26). Thus, the driven members 26 of the cross-linking mechanisms 3 and 4 of each of the carriages are positioned on the right and left sides, respectively, of the associated deck 1.

Each deck 1 is fitted with a front elevator 27 and a rear elevator 28 for elevating the driven members 26 of the associated cross-linking mechanisms 3 and 4, respectively. The elevators 27 and 28 comprise vertical slide rods 30 and 31, bearing members 32 and 33, and cam followers 34 and 35, respectively. Each deck 1 is also fitted with two slide guides 29 fixed to it and extending through it each under one driven member 26. Each slide rod 30 or 31 is supported by the slide guide 29 under the associated driven member 26 and can vertically slide through this guide. The bearing members 32 and 33 are fixed to the tops of the slide rods 30 and 31, respectively, and have guide grooves 32a and 33a, respectively, formed in their tops. Each driven member 26 engages rollably and movably with the associated guide groove 32a or 33a. The cam followers 34 and 35 are rollers supporting the bottoms of the slide rods 30 and 31, respectively. Thus, the elevators 27 and 28 of each of the carriages are positioned on the right and left sides, respectively, of the associated deck 1.

A right cam rail 36 and a left cam rail 37 lie between the guide rails 5a and 5b on the floor and extend in parallel with them. While each of the carriages is running along a limited section (not shown) of the running track, its cam followers 34 and 35 roll on the cam rails 36 and 37, respectively, lifting the associated elevators 27 and 28, respectively. The cam rails 36 and 37 are offset longitudinally from each other by the distance longitudinal of the deck 1 between the elevators 27 and 28 of each of the carriages so that the elevators can be lifted in synchronism.

Figure 4:
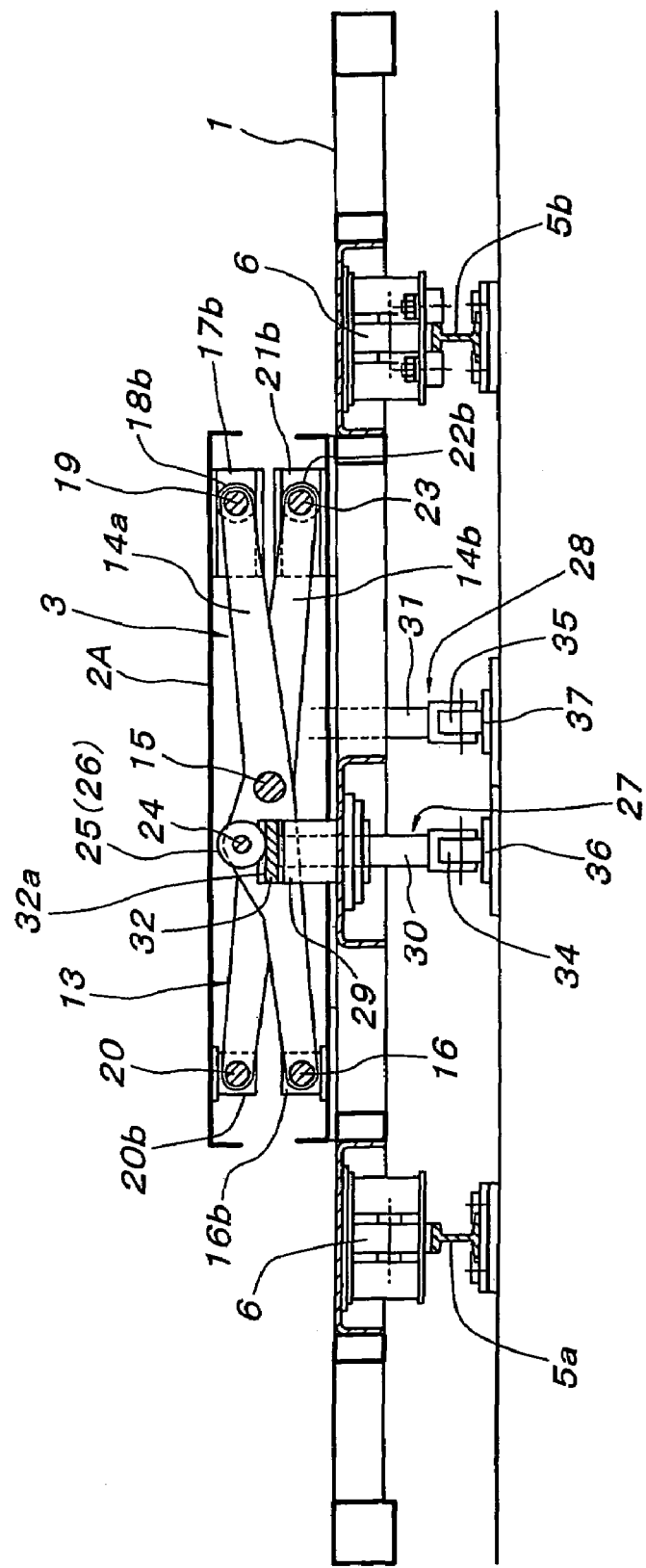
FIG. 4 is an enlarged lateral cross section of the conveying apparatus, showing the carriage as shown in FIG. 1.
Figure 5:
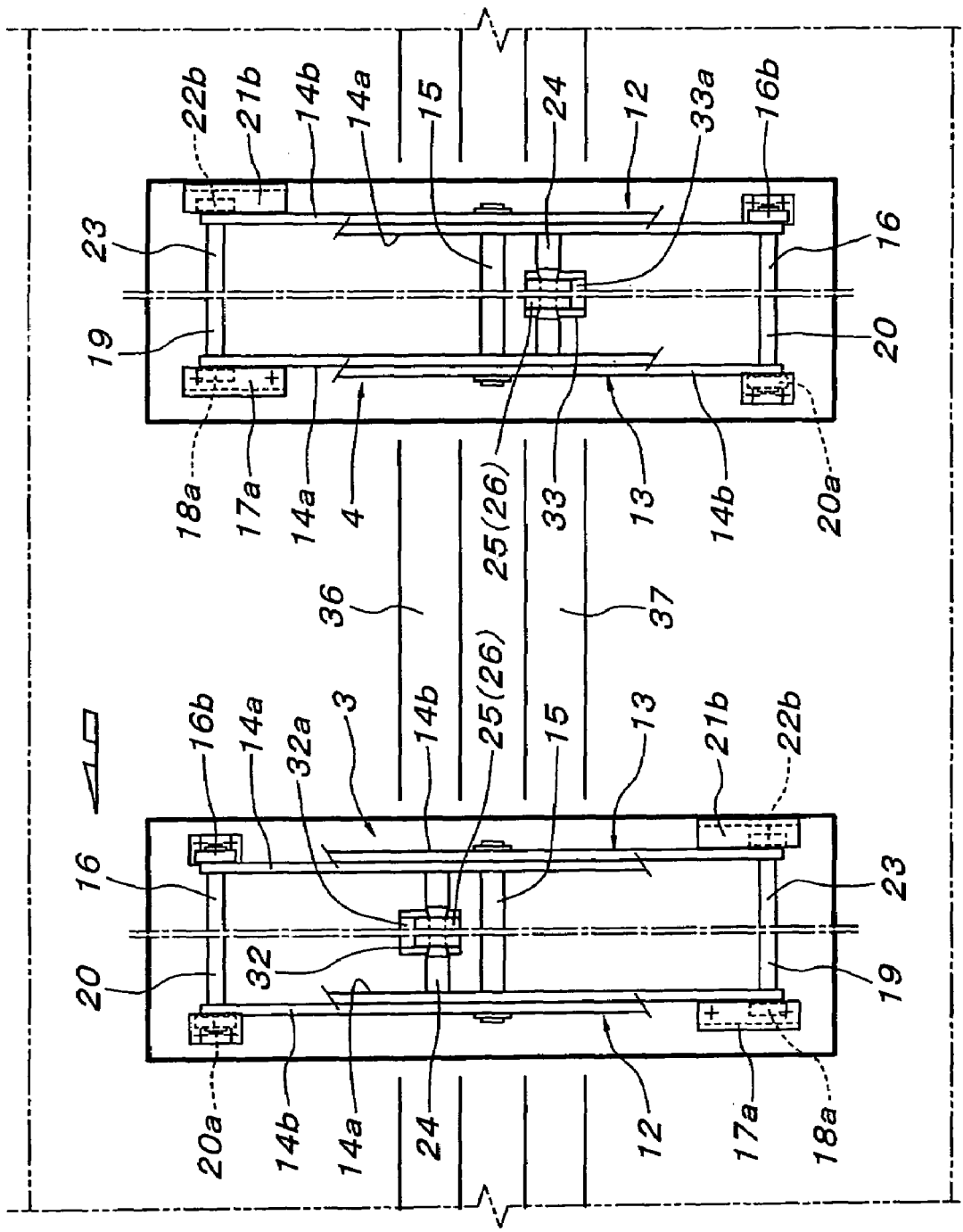
FIG. 5 is an enlarged, partially broken top plan of part of the conveying apparatus, showing a front cross-linking mechanism and a rear cross-linking mechanism.
Figure 6:
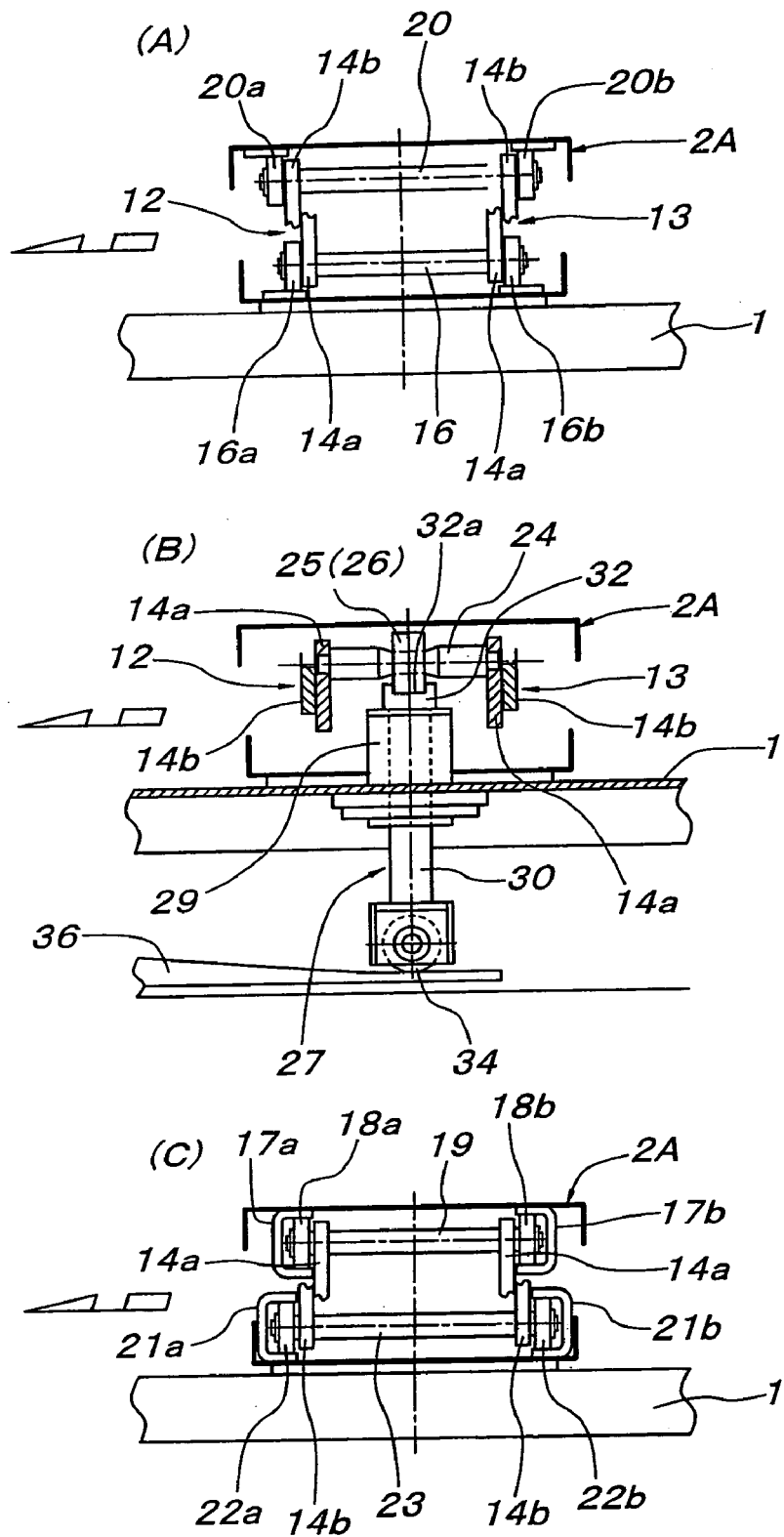
FIG. 6A is an enlarged longitudinal cross section of part of the conveying apparatus, showing the ends of links of a cross-linking mechanism that are adjacent to the associated pivot shafts.
FIG. 6B is an enlarged longitudinal cross section of part of the conveying apparatus, showing an elevator etc.
FIG. 6C is an enlarged longitudinal cross section of part of the conveying apparatus, showing the sliding ends of links of a cross-linking mechanism.

The deck drivers 7 move the carriages at the constant speed along the guide rails 5a and 5b. While each of the carriages is running outside the limited section of the running track, as shown in FIG. 4 etc., its carriers 2A and 2B are lowered to their lower limit positions by gravity. In the meantime, the associated elevators 27 and 28 are supported at their lower limit positions by the associated slide guides 29, with the associated cam followers 34 and 35 out of contact with the floor. Accordingly, the work W on these carriers 2A and 2B is in its lower limit position relative to the associated deck 1.

The work W is shown as supported directly on the carriers 2A and 2B of one of the carriages. Actually, however, the work W is placed on a suitable support attachment, which is supported on the carriers 2A and 2B. The cross-linking mechanisms 3 and 4 of each of the carriages might support a long carrier in place of two carriers 2A and 2B.

When each of the carriages enters the limited section of the running track, as shown in FIGS. 1 and 2, its cam followers 34 and 35 come into contact with the rear end slopes of the cam rails 36 and 37, respectively, at the same time. While the cam followers 34 and 35 roll forward on the rear end slopes, the associated elevators 27 and 28 are lifted in synchronism.

Figure 7:
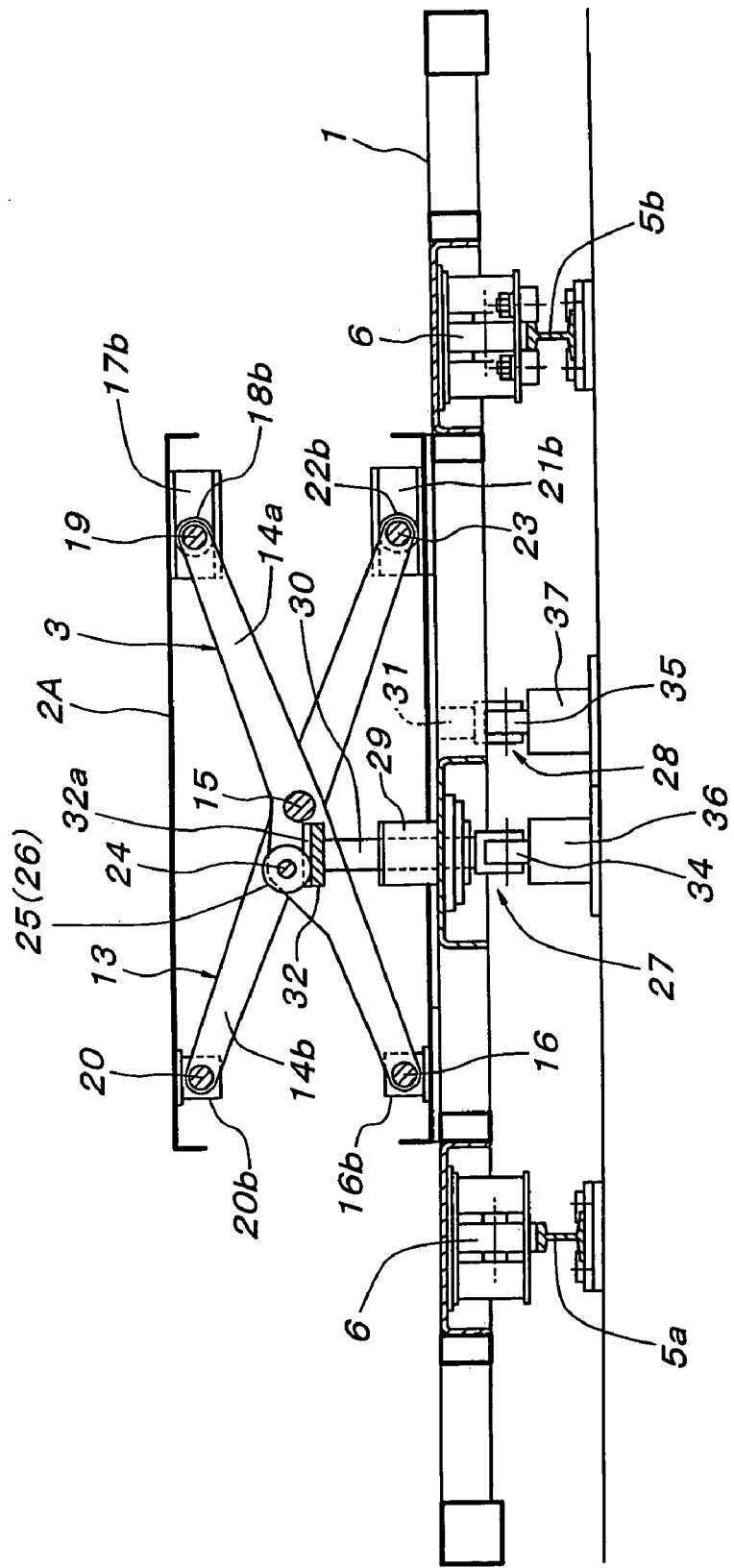
FIG. 7 is an enlarged lateral cross section of the conveying apparatus, showing a carrier elevated from its lower limit position shown in FIG. 4 to its upper limit position.

While the elevators 27 and 28 are lifted in synchronism, as shown in FIG. 7, the pairs of links 12 and 13 of the associated cross-linking mechanisms 3 and 4 erect together. Specifically, the associated slide rods 30 and 31 are lifted with the associated bearing members 32 and 33, elevating the associated driven members 26. This causes the associated inner links 14a to pivot on the associated lower pivot shafts 16, causing the associated outer links 14b to pivot on the associated upper pivot shafts 20 in symmetry with the inner links 14a. Consequently, the associated carriers 2A and 2B are elevated in parallel. In the meantime, the associated upper rollers 18a and 18b and lower rollers 22a and 22b roll along the associated upper guide rails 17a and 17b and lower guide rails 21a and 21b, respectively. The pivotal movement of the inner links 14a horizontally shifts the driven members 26, while the bearing members 32 and 33 are elevated vertically. Consequently, the driven members 26 roll in the guide grooves 32a and 33a of the bearing members 32 and 33.

As stated above, the front and rear cross-linking mechanisms 3 and 4 of each of the carriages erect in synchronism, so that the associated carriers 2A and 2B are elevated in parallel to their upper limit positions, with their levels kept equal. As a result, the position of the work W on the carriers 2A and 2B is changed over to its upper limit. In other words, while the carriage is running along the limited section of the running track, it is possible to elevate the work W automatically to the position suitable for the working on the work in this section.

While the cam followers 34 and 35 of each of the carriages are rolling on the front end slopes (not shown) of the cam rails 36 and 37, respectively, the associated elevators 27 and 28 are lowered in synchronism by gravity, so that the associated cross-linking mechanisms 3 and 4 are retracted in synchronism by gravity. As a result, the associated carriers 2A and 2B are lowered to their lower limit positions.

The decks 1 might be driven by a chain conveyor along an endless circulation track, which includes a conveying path extending over the floor and a return path extending under the floor. A pair of cam rails extend along the return path and are U-shaped in cross section. In this case, the cam followers 34 and 35 of the elevators might be adapted for engagement with the U-rails. In this case, the bearing members 32 and 33 of the elevators might be rails U-shaped in cross section, and the driven members 26 of the cross-linking mechanisms might be adapted for engagement with these rails. While the carriages are running along the return path, the carriers 2A and 2B would hang down and could be elevated toward the floor.

Figure 8:
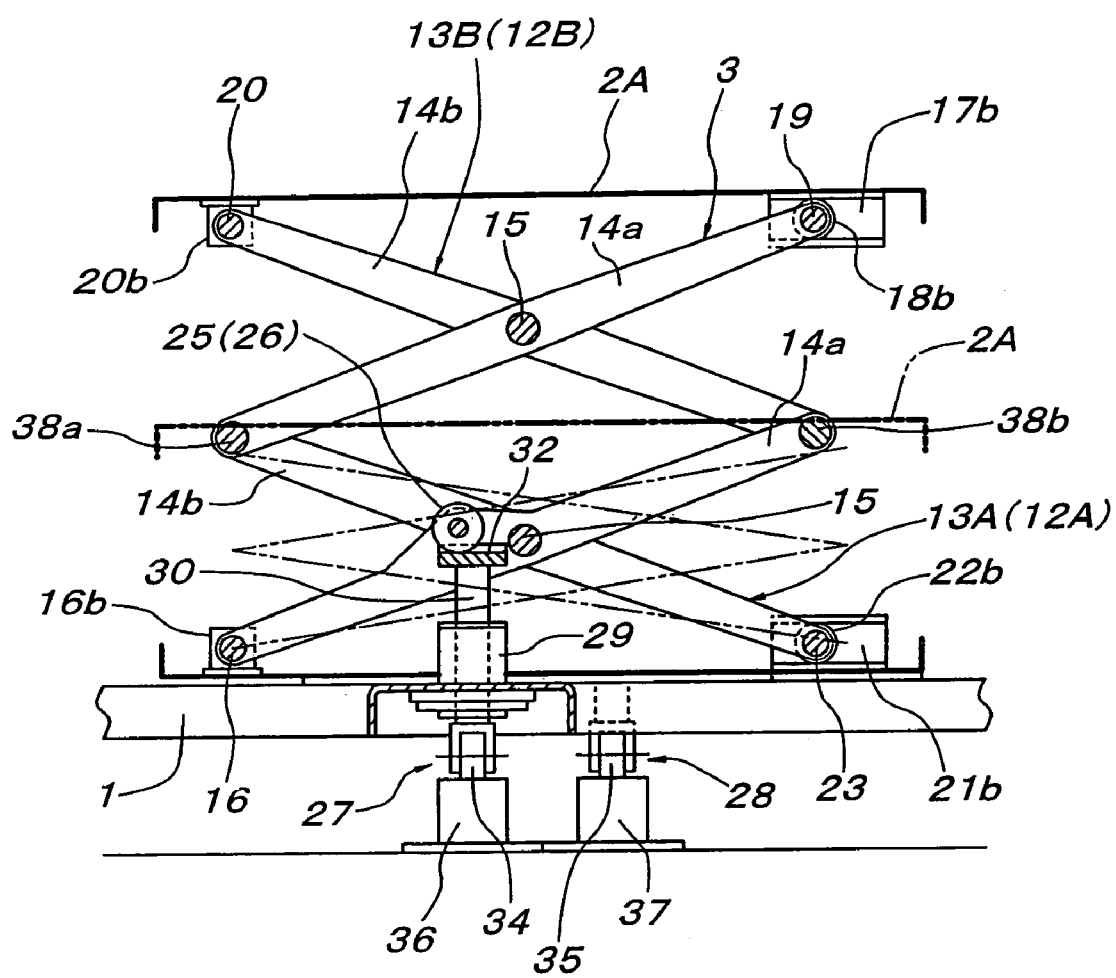
FIG. 8 is a lateral cross section of part of a conveying apparatus according to another embodiment of the present invention, showing a carrier elevated to its upper limit position.

FIG. 8 shows a carriage of another conveying apparatus embodying the present invention. The carriage includes a pair of cross-linking mechanisms 3 and 4, each of which includes two lower pairs of intercrossed links 12A and 13A and two upper pairs of intercrossed links 12B and 13B. The lower pairs of intercrossed links 12A and 13A are identical with the pairs of intercrossed links 12 and 13, respectively, of the foregoing embodiment. The upper pairs of intercrossed links 12B and 13B are substantially identical with the pairs of intercrossed links 12 and 13, respectively. The upper ends of the outer links 14b of the lower pairs 12A and 13A are connected pivotally with the lower ends of the inner links 14a of the upper pairs 12B and 13B by a fulcrum shaft 38a. The upper ends of the inner links 14a of the lower pairs 12A and 13A are connected pivotally with the lower ends of the outer links 14b of the upper pairs 12B and 13B by a fulcrum shaft 38b. The fulcrum shafts 38a and 38b are identical with the fulcrum shafts 15 of the foregoing embodiment. The lower pairs of intercrossed links 12A and 13A support a driven member 25. The upper pairs of intercrossed links 12B and 13B support a carrier 2A or 2B. Each cross-linking mechanism 3 or 4 of this carriage might include three or more vertically connected sets of links.

What is claimed is:

1. A conveying apparatus comprising a cam rail extending along a horizontal running track and a carriage movable along the track, the carriage comprising:
    a deck;
    at least one erectable cross-linking mechanism mounted on the deck;
    the cross-linking mechanism including a pair of intercrossed links having a first link and a second link, the first link supported at one end thereof on a horizontal pivot axis adjacent to and fixed relative to the deck, the first and second links connected together at middle points thereof by a fulcrum parallel with the pivot axis;
    the cross-linking mechanism further including a driven member fitted to the first link between the pivot axis and the fulcrum;
    a carrier supported by the cross-linking mechanism; and
    an elevator supported vertically movably by the deck;
    the elevator including a bearing member fixed to the top thereof, the driven member supported by the bearing member horizontally movably relative thereto;
    the elevator further including a cam follower supported by the bottom thereof, the cam follower being able to follow the cam rail, lifting the elevator, so that the cross-linking mechanism erects to elevate the carrier.

2. A conveying apparatus according to claim 1, wherein the cross-linking mechanism includes two facing pairs of intercrossed links each having a first link and a second link, a fulcrum shaft and a connecting shaft, one end of the first links of the pairs being supported on a horizontal pivot axis adjacent to and fixed relative to the deck, the fulcrum shaft connecting middle points of the intercrossed links of the two pairs thereof, the connecting shaft connecting the pairs of the intercrossed links together at the first links thereof, the fulcrum and connecting shafts being parallel with the pivot axis, the connecting shaft positioned between the pivot axis and the fulcrum shaft and provided with the driven member.

3. A conveying apparatus according to claim 1, wherein the bearing member of the elevator has a guide groove formed therein, and wherein the driven member of the cross-linking mechanism comprises a roller rotatable on an axis parallel with the horizontal pivot axis, the roller engaging with the guide groove rollably and movably.

4. A conveying apparatus according to claim 1, wherein the cam rail comprises a pair of cam rails;
    the cross-linking mechanism comprising a pair of erectable cross-linking mechanisms spaced from each other along the running track;
    wherein each of the links of the two cross-linking mechanisms extends on a vertical plane perpendicular to the running track;
    the elevator comprising a pair of elevators;
    wherein each of the driven members of the two cross-linking mechanisms is supported by one of the bearing members of the two elevators;
    wherein each of the cam followers of the two elevators can follow one of the cam rails, lifting the associated elevator, so that the associated cross-linking mechanism erects to elevate the carrier;
    wherein the two driven members are offset from each other perpendicularly to the running track;
    wherein the two cam rails are offset longitudinally from each other so as to lift the two elevators in synchronism.

5. A conveying apparatus according to claim 1,
    the cross-linking mechanism including a lower pair of intercrossed links having a first link and a second link, and at least one upper pair of intercrossed links having a third link and a fourth link, the first link supported at one end thereof on a horizontal pivot axis adjacent to and fixed relative to the deck, the first link connected at the other end thereof pivotably with one end of the third link, the first and second links connected together at middle points thereof by a lower fulcrum parallel with the pivot axis, the second link connected at one end thereof pivotably with one end of the fourth link, the third and fourth links connected together at middle points thereof by an upper fulcrum parallel with the pivot axis.

* * * * *